Nov. 11, 1941.  W. S. ROSS  2,262,701
SALT AND PEPPER SHAKER
Filed Oct. 19, 1939
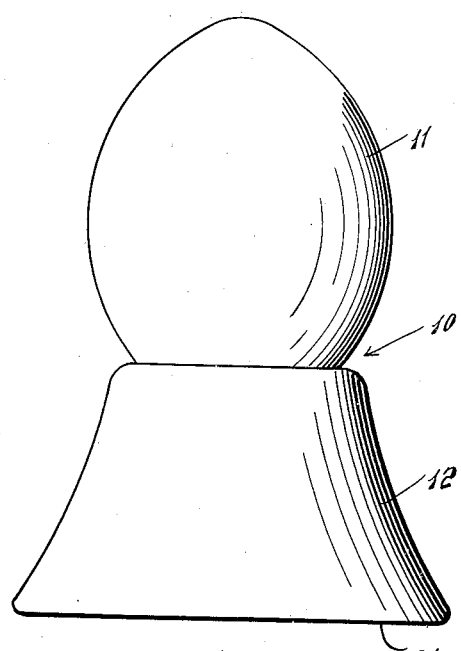
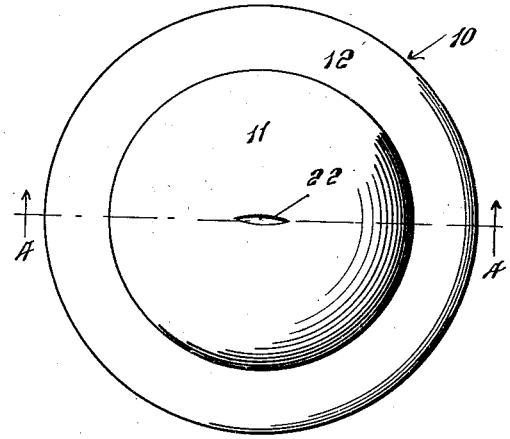
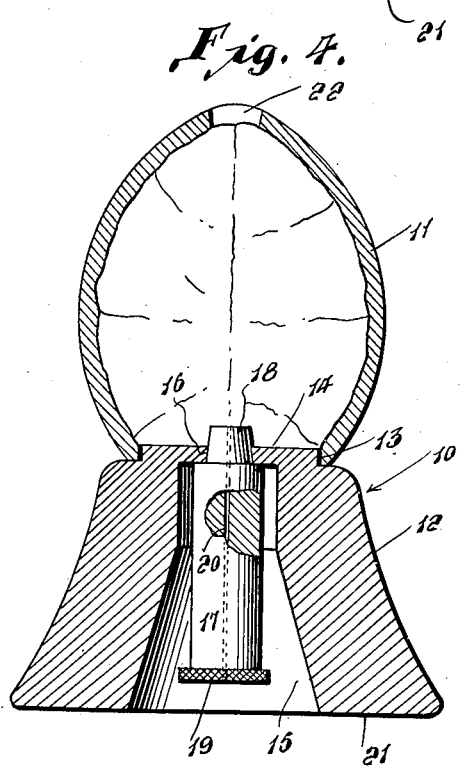
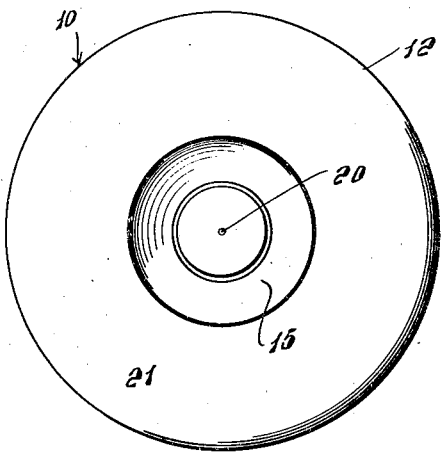
Inventor
William S. Ross
By L. F. Randolph
Attorney Patented Nov. 11, 1941

2,262,701

UNITED STATES PATENT OFFICE 2,262,701

SALT AND PEPPER SHAKER

William S. Ross, St. Davids, Pa., assignor of one-fifth to William Watson Hall and one-fifth to Samuel Lear Harmon, both of Wayne, Pa., one-fifth to Jesse James Smith, Media, and one-fifth to Ernest Murphy, Philadelphia, Pa.

Application October 19, 1939, Serial No. 300,267

5 Claims. (Cl. 65—45)

This invention relates to an improved condiment holder and dispenser and aims particularly to provide a device of this character which will keep salt and pepper and other condiments in a dry, readily flowing condition indefinitely even under very moist and humid conditions.

Still a further object of the invention is to provide a condiment holder having a container portion formed from the shell of an English walnut and connected to a supporting pedestal provided with a passage for filling the shell.

Still a further object of the invention is to provide a slit like discharge orifice in the top of the container portion of the holder and vent means for the opposite end of said container portion by means of which said portion may be vented while a condiment is being dispensed therefrom.

Other objects and advantages of the invention will hereinafter become more fully apparent from the following description of the drawing, which illustrates a preferred embodiment thereof, and wherein:

Figure 1 is a side elevational view of a condiment holder constructed in accordance with the invention, Figure 2 is a top plan view of the same, Figure 3 is a bottom plan view of the same, and Figure 4 is a vertical central sectional view taken substantially along the line 4—4 of Figure 2.

Referring more particularly to the drawing, wherein like reference characters designate like or corresponding parts throughout the different views, 10 designates generally a condiment holder constructed in accordance with the invention and comprising generally a container 11 and a pedestal 12 for supporting the container. The container 11 is preferably egg shaped and formed of a moisture absorbing material, and as illustrated, container 11 is formed from the shell of an English walnut, one end of which is cut-off to form the opening 13.

The pedestal 12 is generally bell shaped and is provided at its top with a circular tit portion 14 for engaging the opening 13. The periphery of the tit portion 14 may be suitably secured in any manner, not shown, to the container 11 to permanently connect it to the pedestal 12. The pedestal 12 is provided with a longitudinal bore 15 the bottom portion of which is enlarged, as best seen in Figure 4. The inner end of the bore 15 communicates with a restricted opening 16 in the tit 14 which communicates with the interior of the container 11 for filling the latter. It will be noted that the funnel shaped construction of the bore 15 facilitates filling the container 11. A stopper or plug 17 is provided with a restricted tapered end 18 adapted to fit and close the opening 16, said plug 17 being removable and being provided with a relatively long shank portion for positioning its enlarged serrated end 19 adjacent the diverging end of the bore 15 so that the portion 19 may be readily grasped between the fingers for detaching the plug 17. As best seen in Figure 3, plug 17 is provided with a longitudinal bore 20 opening into the container 11 and providing a vent, as will hereinafter be described. Pedestal 12 is preferably formed of a relatively soft wood such as pine and is provided with a flat portion 21 on which the holder 10 is adapted to rest when not in use. The apex of the container 11 is provided with a single slit like discharge opening from which the contents thereof may be discharged when the holder 10 is inverted.

From the foregoing it will be seen, that the container portion 11 may be readily filled by removing plug 17 after which the plug 17 may be replaced for closing the opening 16. By then inverting holder 10 the condiment contained therein may be discharged through the orifice 22 and the container portion 11 simultaneously vented by means of the vent passage 20. By forming the container 11 from the shell of an English walnut, the contents thereof will be kept in a dry free flowing condition due to the moisture absorbing properties of the shell. The shell is preferably smoothed and polished on its outer side to render this side moisture resistant while the inside of the shell is left in its natural state so that whatever moisture enters the interior thereof through the discharge orifice 22 will be absorbed by the inner side of the shell thereby preserving the condiment contained therein in a dry free flowing state under even the most humid conditions and for an indefinite period.

Various modifications are contemplated and may be resorted to provided they fall within the spirit and scope of the invention as hereinafter defined by the appended claims.

I claim as my invention:

1. A condiment holder comprising a pedestal provided with a seat at its top, an egg shaped container having an open end for engaging said seat and fixed thereto, a bore extending through said pedestal and opening into said container for filling the latter, a stopper for said bore, and said container being provided with a single slit like opening at its top forming a discharge orifice.

2. A salt and pepper shaker comprising a pedestal, a container, of moisture absorbing material, mounted thereon and provided with a slit like opening in its top, a bore extending through said pedestal and opening into said container for filling it, and a stopper removably mounted in said bore for closing the passage therethrough.

3. A condiment holder and dispenser comprising a pedestal, formed of wood, a container, formed of an English walnut shell, and provided with an opening in one end for engaging the pedestal, the opposite end of said shell being provided with a slit like dispensing orifice, said pedestal being provided with a bore extending the length thereof and opening into the interior of said shell to form a funnel shaped filling passage, and a stopper removably mounted in the restricted end of said bore for closing the opening therethrough.

4. A device as in claim 3, said stopper being provided with a relatively small bore extending longitudinally therethrough and forming an air vent.

5. A salt and pepper shaker comprising a container portion formed of the shell of an English walnut having a relatively large opening in one end thereof, a pedestal having a seat portion at its top for engaging said opening for mounting the shell thereon, said pedestal being provided with an inwardly converging bore opening into the shell for filling the shell, the apex of said shell being provided with a slit like discharge orifice, and a plug for closing the bore of said pedestal and removably mounted therein.

WILLIAM S. ROSS.